Sept. 20, 1960 L. A. WIEGEL 2,953,229
FRUIT PICKING APPARATUS
Filed Aug. 27, 1958 4 Sheets-Sheet 1
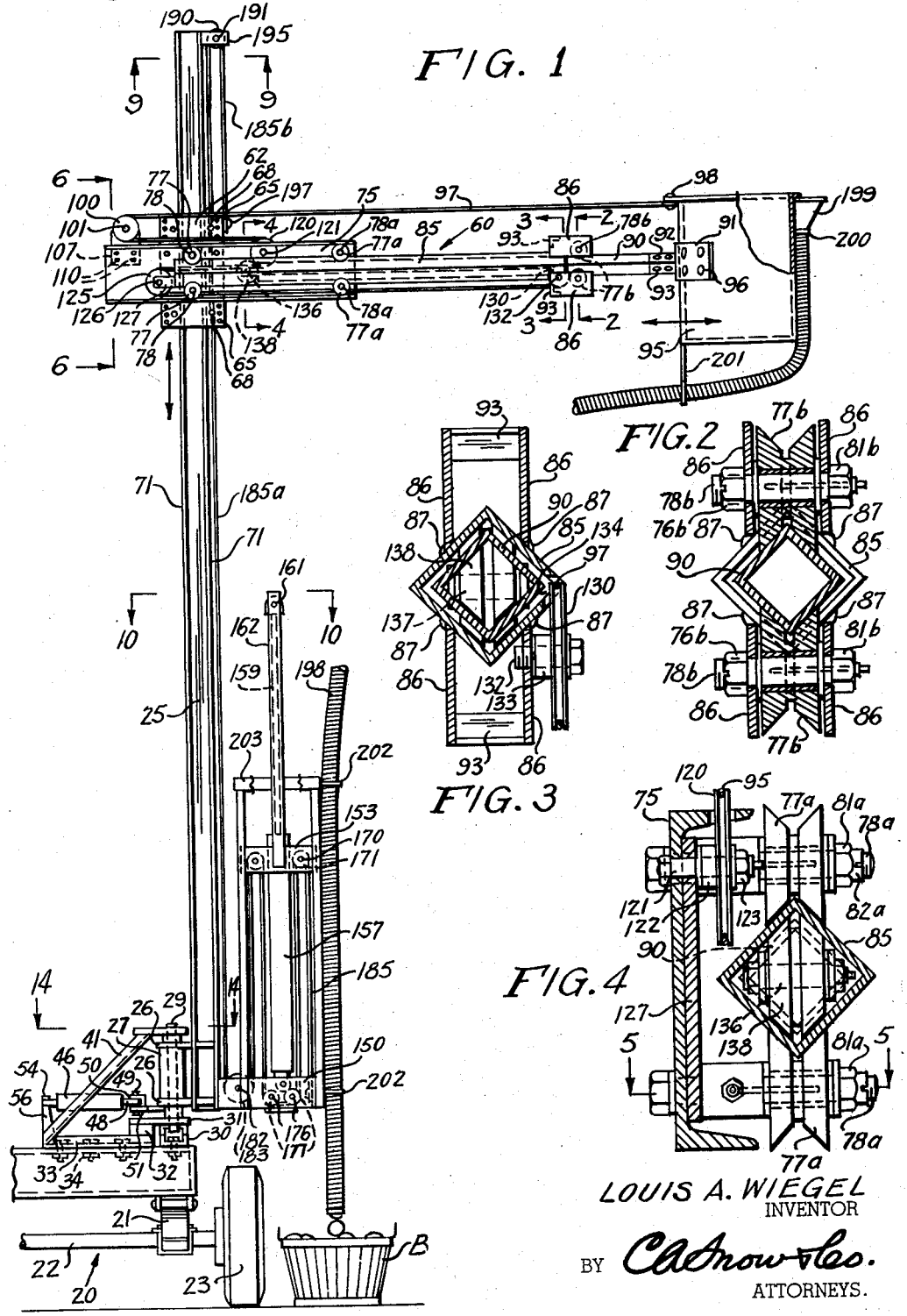
LOUIS A. WIEGEL
INVENTOR
BY C.A. Snow & Co.
ATTORNEYS.

Sept. 20, 1960  L. A. WIEGEL  2,953,229
FRUIT PICKING APPARATUS
Filed Aug. 27, 1958  4 Sheets-Sheet 2

LOUIS A. WIEGEL
INVENTOR

BY *Cl Snow & Leo*
ATTORNEYS.

Sept. 20, 1960  L. A. WIEGEL  2,953,229
FRUIT PICKING APPARATUS
Filed Aug. 27, 1958  4 Sheets-Sheet 3
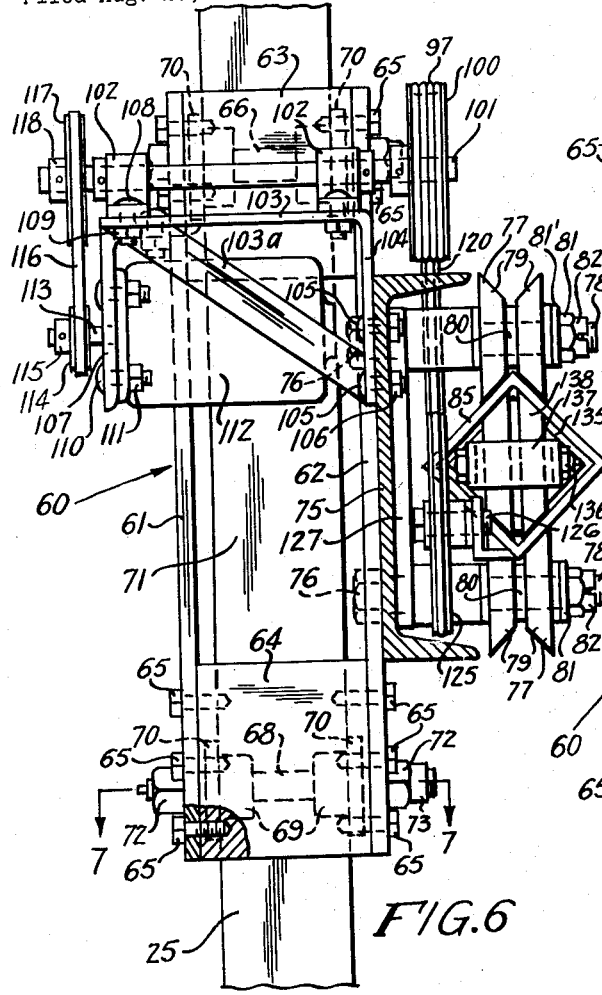
FIG. 6
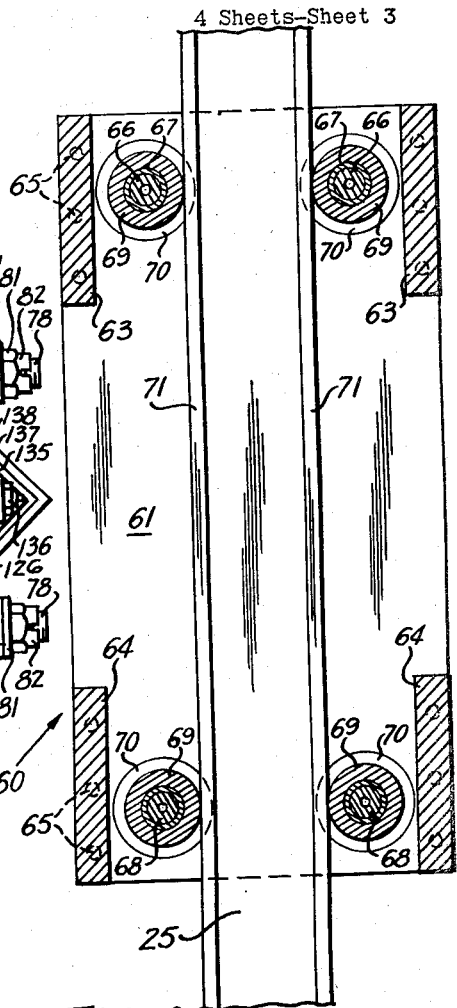
FIG. 8
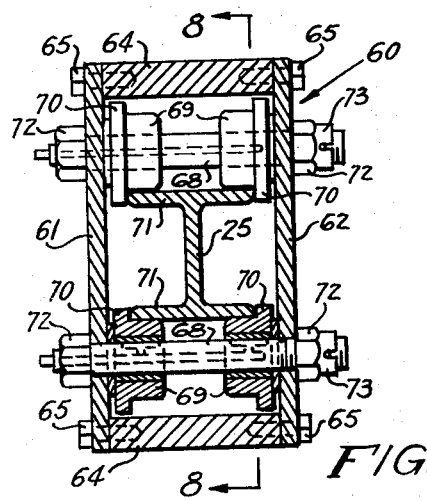
FIG. 7
FIG. 9
LOUIS A. WIEGEL
INVENTOR
BY Chrow Leo.
ATTORNEYS.

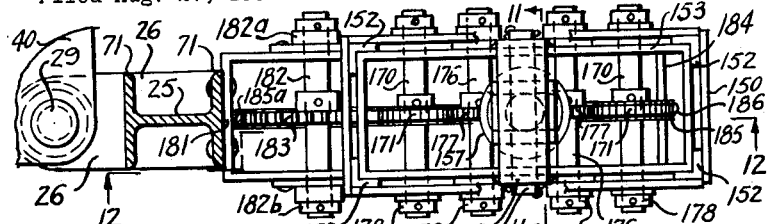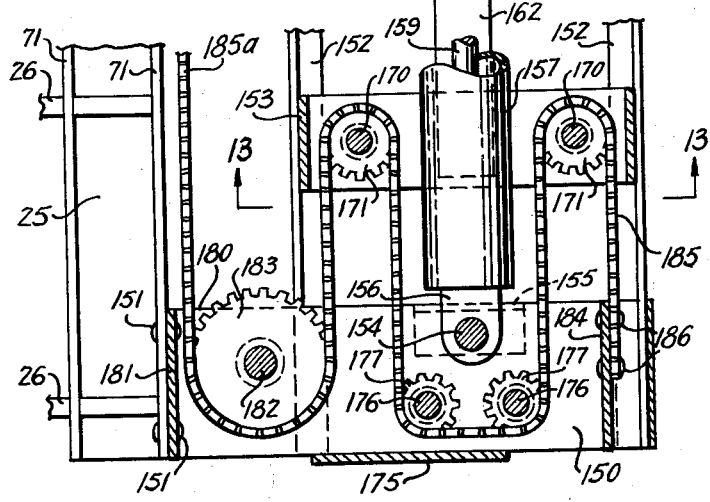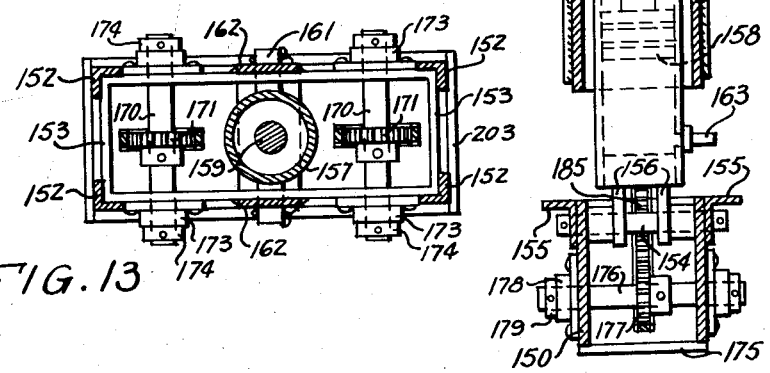

United States Patent Office 2,953,229
Patented Sept. 20, 1960

2,953,229

FRUIT PICKING APPARATUS

Louis A. Wiegel, Pine Castle, Fla., assignor to Pick-In-Rig Inc., Orlando, Fla., a corporation of Florida Filed Aug. 27, 1958, Ser. No. 757,468

2 Claims. (Cl. 193—7)

This invention relates to a fruit picking apparatus, and more particularly to a mobile platform for the use of pickers in picking fruit manually.

A primary object of the invention is the provision of an apparatus of this character which includes a mobile platform having one or more uprights extending therefrom, upon each of which uprights is mounted a transversely extending member, containing at its end a bucket in which a fruit picker may stand.

An additional object of the invention is the provision of means whereby the laterally extending portion may be extended or retracted, in order to render all parts of the fruit bearing tree readily accessible to the picker.

An additional object of the invention is the provision of means whereby the laterally extending arm may be moved upwardly or downwardly to a desired height on the vertical upright, to further facilitate the picking of the fruit at various levels of the trees.

Still another object of the invention is the provision of means whereby the vertical post may be rotated about a vertical axis, correspondingly rotating the horizontal or laterally extending arm, and its associated bucket, whereby the fruit may be picked over a wide range of the tree, without the necessity of moving the platform.

An additional object of the invention is the provision of means adjacent the bucket, which may comprise a flexible tube or the like, whereby fruit may be dropped directly into the upper end of said tube, and thence conveyed to a basket or other receptacle at ground level.

A more specific object of the invention is the provision of such a device whereby the vertical upright is rotated, about a vertical axis, to swing the laterally extending arm, and the position of the laterally extending arm on the vertical upright are both controlled by hydraulic means.

Still another object of the invention is the provision of means under the control of the picker for extending or retracting a telescoping portion of the horizontal arm.

An additional object of the invention is the provision of a mobile platform provided with one or more vertical uprights, each carrying a laterally extending arm having a bucket at the end thereof, so that a portion of a plurality of trees may be picked simultaneously.

Additional objects reside in the combinations of elements, features of construction, and arrangements of parts, all as will be more fully pointed out hereinafter, and shown in the accompanying drawings.

A still further object of the device is the provision of such an apparatus which will be sturdy and durable in construction, reliable and efficient in operation, and relatively simple and inexpensive to manufacture, assemble and utilize.

Still other objects will in part be obvious, and in part be pointed out as the description proceeds and shown in the accompanying drawings, wherein:

Figure 1 is a side-elevational view of a fragment of a mobile platform, having a vertical upright supported thereon, the upright carrying a transverse telescoping arm, certain concealed elements of the apparatus being indicated in dotted lines.

Fig. 2 is an enlarged sectional view taken substantially along the line 2—2 of Figure 1 as viewed in the direction indicated by the arrows.

Fig. 3 is an enlarged sectional view taken substantially along the line 3—3 of Fig. 1 as viewed in the direction as indicated by the arrows.

Fig. 4 is an enlarged sectional view taken substantially along the line 4—4 of Fig. 1 as viewed in the direction indicated by the arrows.

Fig. 6 is an enlarged sectional view taken substantially along the line 6—6 of Fig. 1 as viewed in the direction indicated by the arrows.

Fig. 7 is a sectional view taken substantially along the line 7—7 of Fig. 6.

Fig. 8 is a sectional view taken substantially along the line 8—8 of Fig. 7 as viewed in the direction indicated by the arrows.

Fig. 9 is a sectional view taken substantially along the line 9—9 of Fig. 1 as viewed in the direction indicated by the arrows.

Fig. 10 is a sectional view taken substantially along the line 10—10 of Fig. 1 as viewed in the direction indicated by the arrows.

Fig. 11 is a sectional view taken substantially along the line 11—11 of Fig. 10 as viewed in the direction indicated by the arrows.

Fig. 12 is a sectional view taken substantially along the line 12—12 of Fig. 10 as viewed in the direction indicated by the arrows.

Fig. 13 is a sectional view taken substantially along the line 13—13 of Fig. 12 as viewed in the direction indicated by the arrows.

Similar reference characters refer to similar parts throughout the several views of the drawings.

Having reference now to the drawings in detail, there is generally indicated at 20 a platform, which may be of any desired type, and which carries depending journals 21, supporting axles 22, which carry wheels 23, in order that the platform may be readily moved from place to place.

The platform may be provided, if desired, with a tongue, not shown, to permit the towing of the platform from place to place or, alternatively, may comprise the body of a truck, or a similar self-propelled vehicle, if desired.

Figure 15:
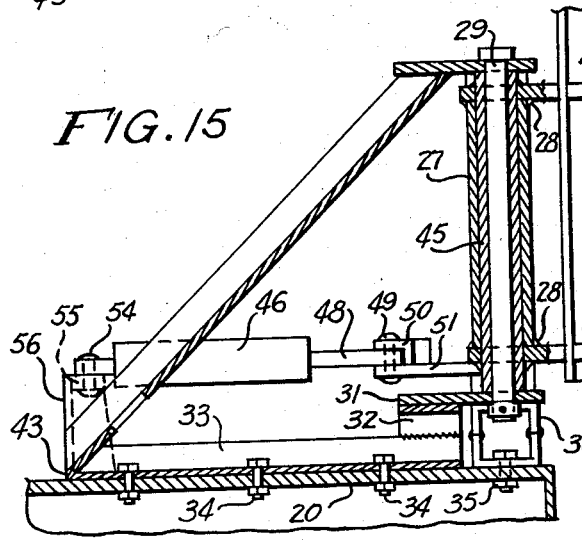
Fig. 15 is a sectional view taken substantially along the line 15—15 of Fig. 14 as viewed in the direction indicated by the arrows.

The platform 20 is provided with one or more vertically extending uprights 25, each of which adjacent its lower end carries a pair of apertured projecting tongues 26, which have extending between them a suitable sleeve 27 or the like, secured thereto as by welding 28 (see Figs. 1 and 15). The sleeve 27 surrounds a pin 29, for rotatable movement thereabout. The pin 29 has its lower end journaled in a supporting block 30, which carries a journal lug 31, which is carried in turn by a supporting block 32 suitably welded or otherwise secured to a transverse channel iron member 33, the latter being secured as by bolts 34 to the top surface of platform 20, a similar bolt 35 with an associated nut secured at the bottom of block member 30 also to the top of platform 20.

Figure 14:
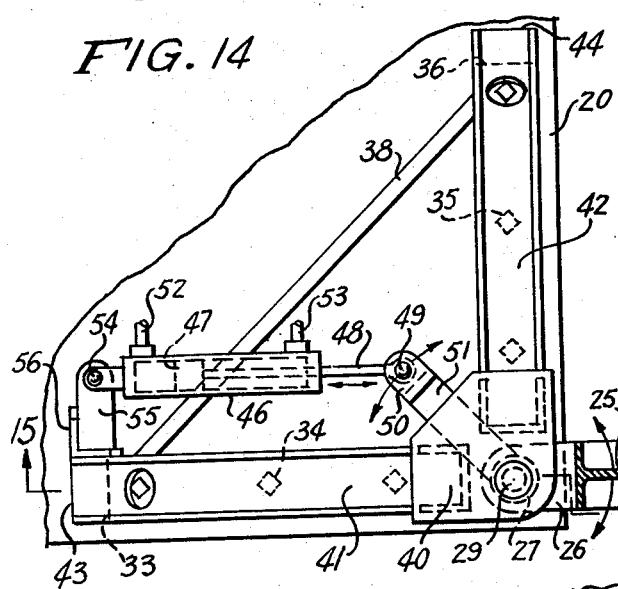
Fig. 14 is an enlarged sectional view taken substantially along the line 14—14 of Fig. 1 as viewed in the direction indicated by the arrows.

As best shown in Fig. 14, a second supporting member 36 extends in right angled relation to member 33, and is secured to the base 20 as by means of bolts 37, corresponding to the bolts 34. A diagonally extending horizontal brace 38 extends between the outer ends of the members 33 and 36.

The upper end of pin 29 is journaled in an aperture in a plate 40, which is supported by two upwardly extending angularly disposed members 41 and 42, positioned at right angles to each other, and having their lower ends 43 and 44, respectively, secured adjacent the ends of members 33 and 36, respectively. As best shown in Fig. 15, the pin 29 is also surrounded by an interior cylinder 45, positioned within the cylinder 27.

It will thus be seen that the upright 25 is swingable about the sleeve 45, by virtue of its mounting on sleeve 27.

Such movement is effected, by means of a hydraulic cylinder 46 which contains, as best shown in Fig. 7, a piston 47, from which extends a piston rod or stem 48. The piston rod 48 is pivotally connected as by means of a pin 49 or the like to a fork 50 carried at the extremity of an arm 51, which in turn is fixedly secured to the sleeve 27. Hydraulic fluid is supplied to the cylinder 46 from any desired reservoir or the like through tubes 52 and 53, and controlled by suitable valve means (not shown), to move the piston 47 in either direction, correspondingly to swing the arm 51, and simultaneously to swing the upright 25 throughout a substantially 45° angle. The opposite end of the cylinder 46 is connected by means of a pivot pin 54 to a lug 55, which projects from an upright member 56 carried by member 33.

The upright 25 has movably mounted thereon a transversely extending horizontal arm 60. The arm 60 is vertically movable on upright 25, in a manner to be more fully described hereinafter described, and includes side plates 61 and 62 which are connected together at their upper and lower ends by oppositely disposed pairs of transverse plates 63 and 64, respectively. The securing means takes the form of bolts 65 extending through suitable apertures in the plates 61 and 62, and engaging in suitable threaded apertures in the ends of the plates 63 and 64, the assembly forming a cage surrounding upright 25, which, it is to be noted, is preferably in the form of an I beam, as best shown in Fig. 7. Extending transversely between side plates 61 and 62 adjacent the transverse plates 63 are a pair of axles 66 and 67, while a corresponding pair of axles, each indicated at 68, extends similarly between the lower plates 64, and in substantial parallelism thereto. Each axle 68 carries a pair of rollers 69, each of which is provided with a flange, on the outer side thereof, adjacent its associated transverse plate 64. The flanges 70 are adapted to engage the outer cross flanges 71 of the I beam member and to ride therealong.

Each axle 68 is provided at each end with a lock nut 72, and at one end with a lubricant fitting 73.

Secured to the outer side of plate 62, as best shown in Figs. 4 and 6, is an elongated channel shaped member 75, the securing means taking the form of nuts 76 carried by bolts or axles 78. The channel shaped member has mounted thereon an inner pair of upper and lower rollers 77, which are mounted on axles 78. The rollers 77 are, as best shown in Fig. 6, comprised of two inwardly beveled confronting roller members 79, spaced apart as by washers 80, and secured by means of friction lock nuts 81 and bearing collars 82. Identical upper and lower rollers 77a are mounted on axles 78a adjacent the extending end of the plate 75, and are best shown in Fig. 4. Identical lock nuts 81a and bearing collars 82a are provided for the rollers 77a. The V-shaped 77 and 77a are adapted to mount a diamond shaped hollow member 85, which is extendable and retractable therebetween, in a manner to be more fully described hereinafter.

The outer end of diamond shaped member 85 has secured thereto upper and lower pairs of spaced apart plates 86, the plates being welded to the member 85 as indicated at 87. Plates 86 carry upper and lower axles 78b provided with inner lock nuts 76b and outer lock nuts 81b, which are substantially identical to the previously described components 78, 76 and 81, but spaced more closely together. Mounted on the axles 78b are rollers 77b, which are substantially identical in configuration to the previously described rollers 78. The rollers 77b serve as guides for a diamond shaped member 90 which is adapted to telescope within the member 85. The member 90 carries at its outer end an arcuate plate 91, having a socket member 92 secured as by bolts 93 to the extreme end of the member 90. It should here be noted that the side plates 86 are connected, as best shown in Fig. 7, by channel irons 93' at their opposite corners. The plate 91 carries a bucket-like member 95, which is secured thereto as by means of bolts 96, and which is adapted for the accommodation of a picker, the bucket 95 being so dimensioned that the picker may conveniently stand or sit thereat.

Means are provided for extending and retracting the members 85 and 90, and take the form of a V-belt 97, which is secured as by a pin 98 to a flange or lug 99 extending from the inner side of the bucket 95. The V-belt 98 extends rearwardly over a V-pulley 100 which is mounted on axle 101, which is in turn carried by a pair of lugs 102 carried by the horizontal leg 103 of an inverted L-shaped member, the vertical leg of which is indicated at 104, which is bolted as by means of bolts 105 and lock nuts 106 to the end of channel shaped plate 75 which extends beyond the plates 61 in a direction opposite the bucket 95. The horizontal leg 103 carries a depending L-shaped flange 107, the horizontal leg thereof being secured to the leg 103 as by means of bolts 108 and nuts 109. The depending leg of member 107 has bolted thereto as by means of bolts 110 and nuts 111 a suitable electric motor 112, which carries a drive shaft 113, which in turn has mounted thereon a V-pulley 114 which is secured thereto by a suitable lubricating nut 115. The pulley 114 serves to drive a belt 116, which in turn drives a pulley 117 mounted on the axle 101, by means of a lubricating fitting 118. It will thus be seen that energization of motor 112 will serve through pulleys 114 and 117, and belt 116, to drive pulley 100 and its associated V-belt 98. The motor 112 is of the reversible type, and may be suitably controlled from any remote point, as by means of suitable switches (not shown) carried in the bucket 95.

The belt 95 then extends over a pulley 120, mounted on axle 121 carried by the channel shaped member 75, and spaced therefrom by a suitable friction disc 122 and secured thereon by means of a lock nut 123 (see Fig. 4). The belt then reverts to extend over a pulley 125 which is mounted on a stub axle 126 which is carried by a plate-like member 127 which is suitably secured interiorly of channel shaped member 75, as by means of the axles 78 and their associated lock nuts 76 and 81a, see Fig. 6. From the pulley 125, the belt extends forwardly to a pulley 130, mounted on an axle 131, which comprises a bolt 132 suitably engaging in a corresponding threaded aperture in one of the lower side plates 86. A friction disc 133 is spaced between the pulley 130 and the adjacent plate 86. From the pulley 130, the end of belt 97 extends to the inner end of member 90, and is suitably secured thereto, in any desired manner, as indicated at 134 (see Fig. 3).

As shown in Fig. 6, an angularly disposed brace 103a extends between the legs 103 and 104 of the L-shaped bracket member which carries the journals 102 for axle 101.

The inner end of diamond shaped member 90 carries, as best shown in Fig. 6, a pair of projecting V-shaped members 135 which carry projecting plates 136, which serve as journals for the ends of axle 137. The axle 137 carries a guide roller 138 which has outwardly beveled portions, which correspond in configuration to the interior of portion 85, the diamond-shaped member, and which serves to guide the path of travel of telescoping member 90 therein, as best shown in Figs. 3 and 4.

It will now be seen that when the motor 112 is energized, belt 97 will act to extend the member 90 or retract the same, in accordance with the direction of movement of the belt, and correspondingly the bucket 95. Further telescoping or extension may be provided when the member 96 engages the plates 77b, which occasions telescoping of the member 85. The telescoping movement of the member 85 being limited both inwardly and outwardly by any suitable stop means (not shown).

As previously mentioned, suitable means are provided for the raising and lowering of the arm 60 and its associated bucket.

These means include a rectangular box or frame 150, having its ends suitably secured as by means of rivets 151 (see Figs. 10 and 11) to the lower end of upright 25.

The frame 150 is provided at its corners with upwardly extending channel irons 152, which carry between them at an intermediate point a second rectangular frame 153. A transversely extending pivot 154 is suitably journaled in flanged plates 155 which are secured to the outer sides of the side plates of the frame 150. The pivot or axle 154 engages through suitable apertures in depending lugs 156, carried by the lower end of a hydraulic cylinder 157. The cylinder 157 contains, as best shown in Figs. 10 and 11, a piston 158, to which is secured a stem or piston rod 159. The upper end of the stem 159 terminates in a fork 160, which is pivotally carried by an axle 161, which is carried between the sides of a U-shaped member 162. The lower ends of the legs of the U-shaped member carry the frame 153, in such manner that the movement of the piston 159 will serve to raise and lower the frame 153 along the cylinder 157, and relative to the frame 150. A fitting 163 is provided adjacent the base of cylinder 157 for the admission of hydraulic fluid, to raise the piston 158, and its associated stem 159, and hence U-shaped member 162. Hydraulic fluid is supplied to the fitting 163, as it is to the fittings 52 and 53 of cylinder 46 from any desired source of hydraulic fluid, such as a storage tank (not shown) and may be controlled by any suitable valve arrangement (not shown) of conventional type and controlled from any desired position.

The frame 153, which is movable upwardly or downwardly, as previously described, by the movement of the U-shaped member 162, and piston stem 159, is provided with a pair of transversely extending axles 170, each of which carries a sprocket 171.

The axles are provided with locking nuts 173 and bearing collars 174.

The frame 150 is provided with a base plate 175, and carries directly under the pivot or axle 154 a pair of axles 176, each of which carries a sprocket 177. The sprockets 177 are positioned relatively close together and between the sprockets 171. The axles 176 are also provided with suitable lock nuts 178 and bearing collars 179 corresponding to the lock nuts 173 and bearing collars 174. Positioned between a pair of extending portions 180 of frame 150, adjacent the end portion 181, which is secured by rivets 151 to the flanges 71 of I beam 25 is an axle 182, secured in position by means of lock nuts 182a, and provided with bearing collars 182b. The axle 182 carries a relatively large sprocket 183. Interiorly of frame 150, there is positioned a vertical plate 184, to which is secured a chain 185, as by means of rivets 186. The chain extends from the plate 184, which is fixedly secured to the frame 150, over the first of sprockets 170, and thence downwardly and beneath both of sprockets 177, from the innermost of which it then extends upwardly over the other of sprockets 171 and thence downwardly and about sprocket 183. The arrangement is thus such that as the piston stem 159 moves the U-shaped frame member 168 upwardly, the relative length of the chain 185, and particularly that portion 185a of which extends upwardly interiorly of sprocket 183, is effectively decreased. Correspondingly, lowering of the frame 168 will cause the sprockets 170 to move closer to each other, thus increasing the effective operating length of the chain portion 185a. As best shown in Fig. 1, portion 185a extends upwardly about a sprocket 190, carried on axle 191, provided at its ends with lock nuts 192 and lubricant fittings 193 journaled between suitable plates 194 apertured to receive the ends of the axle, which are carried by an open rectangular frame 194, secured as by bolts 196 to the upper extremity of the inner flange 71 of upright I beam 25. From the sprocket 190 the chain extends downwardly as indicated at 185b, and is suitably secured at its end, to one of transversely extending plate portions 63. The securing means taking the form of a rivet or the like 197.

A suitable flexible tube 198 terminates at its upper end in a funnel 199, and is secured as by a clamp or bracket 200 to the outer side of picker's bucket 95. An additional bracket 201 depends from the underside of picker's bucket 95, for the further securing of the flexible tube, which then extends downwardly through a bracket 202 affixed to the upper frame 203 containing the upper ends of channel members 152, and a second bracket 202 secured to the frame 150, to a point closely adjacent the ground. Fruit picked by the operator in the bucket 95 may thus be dropped into the funnel 199, and through the flexible tube 198, to drop into a basket B, or other desired receptacle or container adjacent the base 20. Obviously, the tube 198 is of sufficient diameter to accommodate the fruit being picked.

Figure 16:
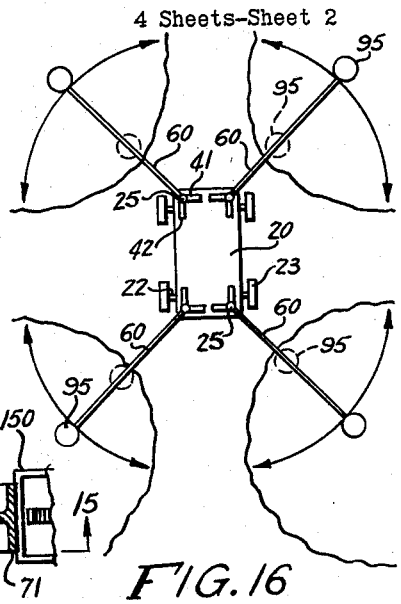
Fig. 16 is a reduced partially schematic view of a mobile platform, showing the arrangement of a plurality of vertical uprights and transversely or laterally extending arms thereon, each arm terminating in a bucket for a picker.

From the foregoing, the operation of the device should now be readily understandable. Obviously, when the hydraulic cylinder 46 is actuated by means of a suitable control valve, the uprights 25 may be swung about relatively wide arcs, as for example shown in Fig. 16. When there are four of these uprights provided, as indicated in Fig. 16, a quarter section of each of four trees may be picked simultaneously by four pickers, there being one or more of the devices provided to pass between adjacent rows of trees, so that either a quarter segment, or, alternatively, a half segment of each tree may be picked, the device then moved forwardly to pick the remaining quarter. By movement of the device between the next adjacent rows of trees, obviously the unpicked side of the previously partially picked trees may similarly be picked. Similarly, the bucket 95, may be moved by means of the chain 185, when the piston within the cylinder 137 is actuated to extend or diminish the relative effective length of the chain 185.

Figure 17:
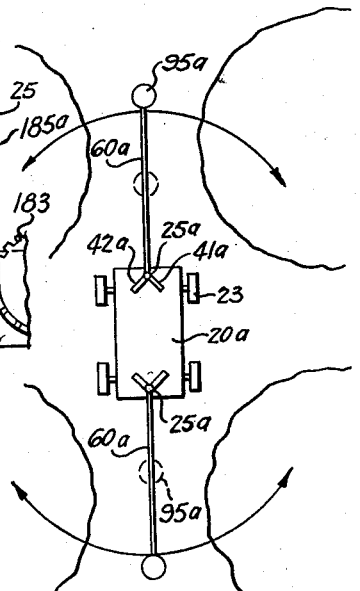
Fig. 17 is a view similar to Fig. 16, but showing a modified form of construction.

Fig. 17 discloses a slightly modified form of arrangement, wherein a platform 20a is provided with wheels 23a, but carries only two uprights 25a, suitably supported in L-shaped supporting frames 41a and 42a similar in all respects to the corresponding members previously described, and which is provided with only two horizontally extending arms 60a, each of which carries at its extremity a bucket 95a, the arrangement being substantially identical to the arms 60 and buckets 95 previously described.

Figure 5:
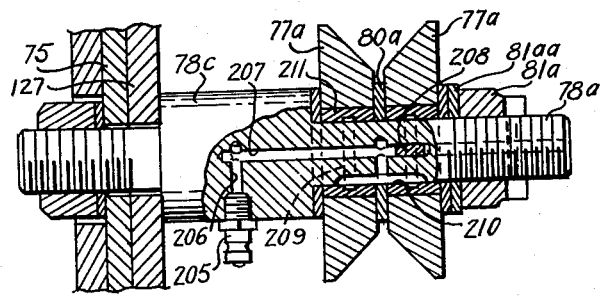
Fig. 5 is a further enlarged sectional view taken substantially along the line 5—5 of Fig. 4.

Fig. 5 is an enlarged detail view of a constructional element, comprising a grease fitting for any desired one of the several axles of the device supporting either sprockets or pulleys. The illustrative embodiment shows a section through the axle 78a. Here the axle 78a carries the pulley 77a and is secured in position by the lock nut 81a, surrounding the bolt 78a, suitable friction washers 81aa being provided between the exterior of the pulley 77a and lock nut 81a. A central disc washer 80a is provided between the opposite segments 77a of the V pulley. The portion of the axle 78a between the inner surface of pulley 77a and the plate 127 is enlarged, as indicated at 78c, and is provided with a grease or lubricant fitting 205.

From the fitting 205, a passage 206 intersects a longitudinally extending passage 207, which extends completely through the axle 78a, and communicates through a passage 208 with cross channels 209 carried interiorly of each pulley portion 77a, the cross channels 209 in turn engaging with a recess 210 formed in the axle 78a, to permit lubricant to be readily provided to the axle, and to a bushing 211, which surrounds the axle 78a to permit free rotation of the pulley thereabout. The above described grease fitting is exemplary, and may be applied to any of the axles carrying either the pulleys or rollers 69, or any of the pulleys carrying the belt 97, or any of the axles carrying the sprockets for the accommodation of the chain 185.

From the foregoing it will now be seen that there is herein provided an improved fruit picking device, which may be readily adapted to a wide variety of functions, and which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a fruit picking device, the combination of a wheeled platform, an upright supporting member embodying an eye beam mounted on said platform, hydraulic means for rotating said supporting member in a horizontal plane, a transverse horizontal arm embodying telescoping arm sections rectangular in cross section, mounted on said upright supporting member, a bucket-like supporting member mounted at the free end of said transverse horizontal arm, movable with said telescoping sections of said transverse arm, and a flexible tube having one end secured to said bucket-like supporting member, through which fruit picked is delivered to a receiving receptacle.

2. In a fruit picking device, the combination of a wheeled platform, an upright supporting member embodying an eye beam mounted on said platform, hydraulic means for rotating said supporting member in a horizontal plane, a horizontal channel shaped vertically movable supporting member mounted on and extending a substantial distance beyond the side of said upright supporting member, a transverse horizontal arm embodying telescoping arm sections, rectangular in cross section, having one of its ends mounted for horizontal movement within said horizontal supporting member, and means for moving said vertically movable supporting member and transverse horizontal arm independently of the movement of said upright supporting member.

References Cited in the file of this patent

UNITED STATES PATENTS

| | | |
|---|---|---|
| 2,450,152 | Miller | Sept. 28, 1948 |
| 2,509,950 | Zierke | May 30, 1950 |
| 2,798,623 | Girardi | July 9, 1957 |